May 31, 1955 J. A. ROEHRIG 2,709,581
VEHICLE SPRING SUSPENSION
Filed Jan. 26, 1953

INVENTOR.
JOHN A. ROEHRIG
BY
William J. Ruano
ATTORNEY

United States Patent Office 2,709,581
Patented May 31, 1955

2,709,581

VEHICLE SPRING SUSPENSION

John A. Roehrig, Pittsburgh, Pa.

Application January 26, 1953, Serial No. 333,177

8 Claims. (Cl. 267—47)

This invention relates to a spring suspension for a vehicle, such as an automobile, bus, truck or trailer and, more particularly, to a leaf spring eye construction which will prevent breakage of the spring eye as the result of severe braking or loading of the vehicle. The present application is directed to an improvement of the device shown in my Patent No. 2,510,418, issued June 6, 1950.

In a conventional type of vehicle front spring suspension having a forward shackle and a rearward loop or eye of the main leaf encircling a stationary pin, there is a great tendency, when the brakes are applied, for the eye portion of the spring, due to its unwinding action, to open to such an extent as to cause breakage thereof. This, of course, necessitates the expense of replacement of the spring and puts the automobile out of use during the time necessary for such replacement. Even though an additional eye formed at the end of an adjacent leaf or wrapper is oftentimes snugly encircled about the first mentioned eye and wrapped in the same direction, such additional eye affords little or no protection because it too tends to open up or unwind as the result of application of the brakes and thereby gives no appreciable back-up support of the main leaf eye.

An object of the present invention is to provide a novel spring suspension for a vehicle, which suspension has a novel leaf spring eye construction which will overcome the above mentioned disadvantages of conventional leaf spring eye constructions.

A more specific object of the invention is to provide a novel spring suspension for a vehicle having a main leaf spring eye wound in such direction and which may be encircled by the eye of a wrapper leaf which is wound therearound in a manner so as to avoid breakage of the main leaf eye even when excessive braking forces are applied to the vehicle brakes or excessive deflection of the springs is encountered due to loading or otherwise.

Other objects and advantages of my invention will become apparent from a study of the following specification and the accompanying drawing wherein.

Figure 1:
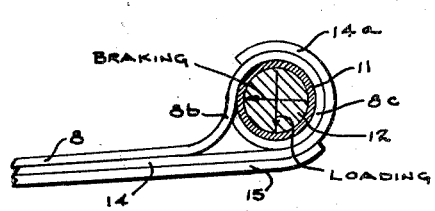
Figure 1 is a fragmentary enlarged view of a vehicle front spring rear end portion substantially as shown in Figure 2 of my above identified patent but with the addition of another wrapper 15.
Figure 2:
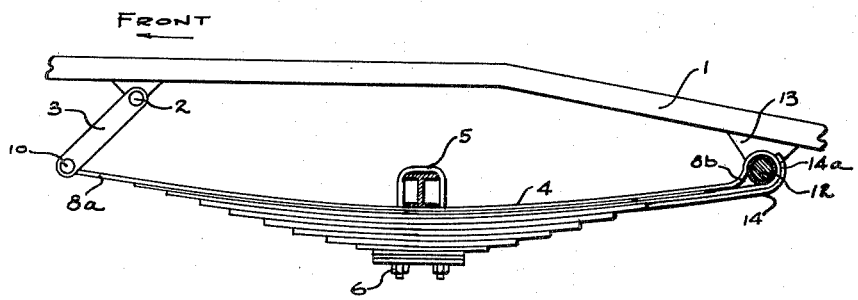
Figure 2 is a left side elevation of a vehicle underframe portion showing a front spring suspension having the leaf spring eye construction embodying the principles of the present invention and Figure 2a is a similar view showing a rear spring suspension.
Figure 2A:
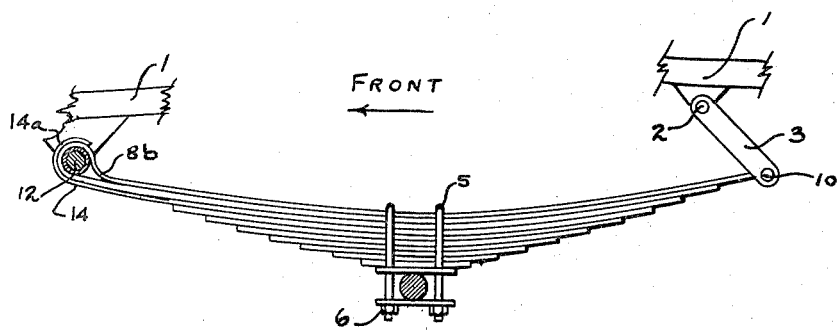

Referring more particularly to Figure 1 there is shown an eye construction for a spring identical to that shown in Figure 2 of my patent above referred to but with an additional wrapper spring 15 to further reinforce the assembly and overcome the possibility of breakage of the eye, particularly as the result of excessive loading. As described in my earlier patent, the upper or main leaf 8 of the spring assembly terminates at the rear end thereof in a reversely bent rear portion 8b which terminates in an eye 8c wound in a clockwise direction and snugly encircling a bushing 11 of bronze or any other suitable material. The bushing is fitted closely around a pin 12 which is supported on a rearward spring support in bracket or hanger 13. An additional leaf or wrapper 14 is wound counterclockwise snugly about the eye 8c and serves as a safety leaf to hold the assembly together in case of breakage of the upper leaf 8. The construction described so far is identical to that shown in Figure 2 of my patent. It has been found that under conditions of excessive loading which results in a vertically downward force on pin 12, as shown by arrow, that there is a tendency to open or unwind the safety wrapper 14a, and, under severe conditions of loading, even to cause breakage thereof. To overcome this possibility I have improved the assembly by the addition of another wrapper or safety leaf 15 which may terminate at the point shown or which may snugly encircle even a greater portion of wrapper 14a.

However there still exists an objection in the spring assembly shown in my former patent as well as that described in the improvement set forth above, namely that an excessive loading force as indicated by the vertically downward extending arrow, has a tendency to unwind or open the main eye 8c, which might even result in breakage thereof under excessive loading conditions, particularly if wrappers 14a and 15 were omitted.

Figure 3:
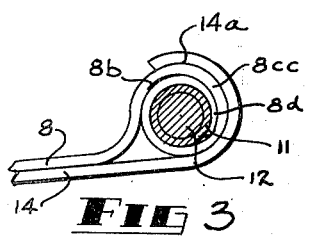
Figure 3 is a fragmentary, enlarged side elevational view of the spring illustrated in Figure 2 and more clearly showing the novel eye construction at one end of the spring leaves.
Figure 5:
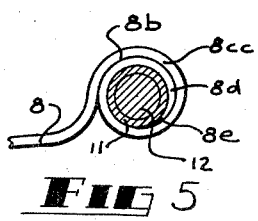
Figure 5 is an enlarged fragmentary side elevational view of a modified form of eye construction for the main leaf.

Figures 3 and 5 show an improvement, embodying the principles of the present invention, which will overcome the above mentioned tendency for main eye 8c to open or to become broken as the result of application of excessive loading or braking forces.

Referring more particularly to Figures 2 and 3 of the drawing, numeral 1 denotes a front frame portion of a vehicle, the forward direction of movement of which vehicle is indicated by the arrow. Pivotally mounted forwardly of the frame portion, about a transverse axis 2 formed by a shackle bolt, is a shackle or link 3 extending in generally a vertical direction. A spring assembly 4, which may be of half elliptical shape with its concave side facing upwardly, or of any other similar shape, is fastened by means of U bolts or clips 5 and nuts 6 to a wheel supporting member of axle 7 extending transversely of the vehicle. The leaves of spring 4 assembly may be made of any suitable material, such as silicomanganese spring steel, or other suitable metal or alloy. The point of connection of the spring assembly to the axle is halfway or substantially half-way of the length of the spring assembly. The upper or main leaf 8 of the spring assembly has its forward end 8a bent in a clockwise direction in the form of an eye about a bushing which, in turn, snugly encircles a pivotal pin 10. The main or tie leaf 8 has an upwardly bent rear portion 8b and terminates in an eye 8cc reversely wound in a clockwise direction and snugly encircling a bushing 11 of bronze or any other suitable material. The bushing is fitted closely around a pin 12 which is supported on a rearward spring supporting bracket or hanger 13. It will be noted that the eye portion 8cc instead of being wrapped to form only a complete circle, as shown in Figure 1, is wrapped to form an additional inner coil or extension 8d. As shown, the extension 8d terminates after providing an additional wrapping of about 235 degrees. However, this additional length of the inner coil extension 8d may be shortened or lengthened to provide an additional inner coiling in the range 0 degrees to about 235 degrees. With such additional wrapping the loading force instead of tending to open eye 8cc and possibly cause breakage, will not have such tendency. Of course, additional inner coils may be employed if desired. Furthermore, braking force extending horizontally forwardly, as shown by the arrow, will likewise not have a tendency to open the eye or to effect breakage thereof, since the back-up of the outer layers of the eye prevent this. Both such forces would merely push the portion of the eye through which the forces act, against the adjoining outer coils of the eye, which serve as back-up layers to reinforce the eye against opening as the result of application of such forces.

Figure 4:
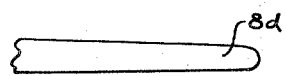
Figure 4 is an enlarged, fragmentary tapered end portion of the main leaf before it is coiled.

It will also be noted that the extension 8d of the eye is gradually tapered in thickness and terminates substantially in a point. Such tapering may be done by a rolling process on the end portion 8d of the eye, which portion, before coiling will appear as shown in Figure 4. By such tapering, a perfect circle may be described snugly about bushing 11.

Figure 5 shows a modification of my invention wherein the end portion of the eye is not progressively tapered, but is of uniform thickness instead, the extreme end being provided with a scarf or bevel of about 45 degrees. In Figure 5 identical reference numerals refer to identical parts as shown in Figure 3. The bevelled end 8e abuts against a portion of the main eye and thus forms a substantially perfect circle for snugly surrounding bushing 11. Wrapper 14 is omitted in Figure 5 and may also be omitted in the structure shown in Figure 3 if so desired, if the additional reinforcing or safety is not necessary. That is to say that the spring assembly in Figures 3 and 5 is complete and constitutes an outstanding improvement over conventional assemblies even with the omission of wrapper 14, in which case leaf 8 will be the sole upper leaf wrapped about bushing 11. Again it should be noted that although the rewrapped part or extension 8d is shown as extending over an angle of about 235 degrees, in addition to the normal 360 degree wrapping as shown in my earlier patent, such extension may be of smaller length so as to provide an inner coil extending anywhere from zero to about 235 degrees.

It will be understood that Figure 2 illustrates only one of the longitudinally extending front spring suspensions of a vehicle, there being a spring suspension of identical construction on the opposite side of the vehicle. Furthermore, these identical constructions may be either at the rear end of the vehicle or at the forward end thereof. If in the rear end, the shackle 3 will be rearmost and the pin 12 and novel eye assembly will be foremost. This construction may also be found in the front end of a vehicle.

In operation, let it be assumed that the vehicle is traveling in a forward direction, as indicated by the arrow, and that the brakes are suddenly applied. The movement of axle 7 would then tend to become arrested, whereas the frame tends to continue to move in the direction indicated by the arrow due to its inertia. Consequently, the pin 12 which is stationarily mounted with respect to the frame will exert a force in the same direction and parallel to the direction of the arrow. Consequently, the spring which is tied to the axle, will tend to be held stationary thereby while pin 12 presses against the reverse bend 8b of the main leaf, in the direction indicated by the small arrow in Figure 1, thereby causing further reverse bending of 8b and in the case of the front spring only, a slight windup of the end portion of eye 8c. Thus there will be no tendency to break the eye 8c and 8cc as would have been the case had the eye been wrapped around the bushing in an opposite direction as in conventional spring suspensions. The force exerted by pin 12 on bushing 11 will have a tendency to push the extreme end of eye 8c against the reversely bent portion 8b.

Since eye 14a of wrapper leaf 14 is found in an opposite direction to the main leaf eye 8c and 8cc and wrapper leaf 14 is longer than leaf 8 it will have a tendency to unwind and tighten its end portion about eye 8c and 8cc as the result of said aforesaid excessive braking of the vehicle. Therefore, it will provide a back-up leaf portion which will tend to creep towards the reversely bent portion 8b of the main leaf spring 8 so as to resist the tendency of portion 8b to become more reversely bent to an abnormal extent. The oppositely wound eyes 8c, 8cc and 14a, therefore, cooperate in a manner to prevent excessive bending and breakage of the main leaf spring eye.

The above described operation occurs not only as a consequence of sudden, excessive braking of the vehicle, but as the result of heavy loading or other factors which cause straightening out of the spring assembly 4.

While I have described a front spring suspension my invention is also applicable to a rear spring suspension in which case the novel eye is formed and encircles a stationary pin, similar to pin 12, while the shackle is rearward, which is similar to shackle 10. However the forward eye is wound in a counterclockwise direction, instead of a clockwise direction, as viewed from the left side of the vehicle, (that is, the driver's side).

Thus it will be seen that I have provided a novel and efficient spring suspension for a vehicle, having a leaf spring eye construction arranged in such manner as to avoid the common tendency of breakage of the eyes resulting from sudden excessive braking or loading of the vehicle and the like.

While a wrapper leaf 14 is shown in cooperation with the main leaf, it will be understood that such wrapper leaf may be omitted, if desired, in which case the main leaf, by virtue of the reverse bend of its end portion and of the fact that its eye is wound in an opposite direction from the conventional direction of wind, will itself be relatively free of breakage.

While I have illustrated and described certain specific embodiments of my invention, it will be understood that these are by way of illustration only, and that various changes and modifications may be made within the contemplation of my invention and within the scope of the following claims.

1. In a spring suspension for a vehicle, a frame member, a wheel supporting axle, a longitudinally extending leaf spring assembly secured at an intermediate point to said axle, a shackle pivotally mounted on said frame member with its lower end secured to a forward end portion of said spring assembly, a hanger secured to a rearward portion of said frame member and having a transversely extending pin supported thereby, the main leaf of said spring assembly having a rear portion bent upwardly in the direction of curvature of the main leaf and terminating in a reversely bent eye wrapped about said pin in a direction opposite to that of said rear portion and in a clockwise direction, as viewed from the left side of the vehicle, so that excessive braking of the vehicle will cause greater reverse bending of said reversely bent portion, said eye being in the form of a spiral extending in excess of 360 degrees and having an inner coil portion which is snugly backed up by an integral outer coil portion, to minimize the tendency of opening of the eye as the result of excessive braking or loading forces.

2. A spring suspension as recited in claim 1 wherein said spring assembly includes a secondary wrapper leaf having a rear end portion looped snugly about said eye to form a protective backing therefor and being wound in a direction opposite to that of the rear eye of said main leaf.

3. In a spring suspension for a vehicle, a frame member, a wheel supporting axle, a longitudinally extending leaf spring assembly secured at an intermediate point to said axle, one end of the main leaf being relatively movable with respect to said frame member and the other being wrapped about a pin fixed with respect thereto, said spring assembly including a main leaf having an upwardly bent rear end portion terminating in an eye curved reversely with respect to said upwardly bent rear end portion and wrapped about said pin, said eye being in the form of a spiral extending in excess of 360° and, having an inner coil portion which is snugly backed up by an outer coil portion to minimize the tendency of opening of the eye as the result of excessive braking or loading forces, said last mentioned end portion of said spring assembly including a wrapper leaf eye extending above said main leaf and looped snugly and in an opposite direction to the curvature of said eye of said main leaf so as to provide a backup layer which will tend to unwind and become tightened onto said main leaf when excessive braking pressure is applied to the vehicle so as to resist the tendency of excessive bending of the reversely bent portion of said main leaf and prevent breakage of the main leaf eye.

4. A vehicle suspending leaf spring assembly comprising an upwardly arched main leaf and a wrapper leaf, an end portion of said main leaf having an upward bend in the direction of curvature of said main leaf and terminating in an eye extending entirely above said main leaf and wound in a direction opposite to said upward bend, said eye being coiled substantially in excess of 360 degrees, having an inner coil portion which is progressively tapered in thickness and which is snugly enclosed within the outer coil portion, the corresponding end portion of the wrapper leaf terminating in an eye wound snugly about and in the opposite direction of wind of the main leaf spring eye.

5. A vehicle multi-leaf spring unit comprising an upwardly arched main leaf spring having an eye at each of its longitudinal extremities, both of said eyes extending upwardly of said main leaf and having centers extending above said main leaf in substantially the same horizontal plane, the rearmost of said eyes being reversely bent in a clockwise direction as viewed from the left side of the spring unit and being integrally formed on a rear end portion of the main leaf which is bent in an opposite direction to the curvature of the main leaf so that the rearmost eye will tend to wind up when mounted on a vehicle and excessive braking pressure is suddenly applied, said eye being coiled in excess of 360 degrees, having an inner coil portion forming a layer extending throughout the major portion of the perimeter of said eye and which is progressively tapered in thickness and is snugly enclosed within the outer coil portion.

6. A vehicle multi-leaf spring unit comprising an upwardly arched main leaf having an eye at each of its longitudinal extremities, the end portion of said main leaf on the front of the rear spring being bent upwardly of said main leaf and its extremity being curved in an opposite direction to the curvature of the main leaf to form the front eye, said front eye being in a counterclockwise direction as viewed from the left side of the vehicle to form the eye so that excessive braking will cause greater upward bending of said upwardly bent portion, said eye being in the form of a spiral, having an inner coil portion which is snugly backed up by an outer coil portion throughout the major portion of its perimeter, to minimize the tendency of opening of the eye as the result of excessive braking or loading forces.

7. A vehicle multi-leaf spring unit comprising an upwardly arched main leaf having an eye at each of its longitudinal extremities, the end portion of said main leaf to be mounted on the front of the rear spring of the vehicle being bent, first upwardly of the main leaf and its extremity being curved in an opposite direction to the curvature of the main leaf to form the front eye, said front eye being formed of more than one turn by a spirally wound portion of said end portion to provide an inner coil portion snugly embraced by an outer coil portion of said rear eye.

8. A spring unit as recited in claim 7 wherein said inner coil portion is progressively tapered in thickness so as to form a point at the end.

References Cited in the file of this patent

UNITED STATES PATENTS

| | | |
|---|---|---|
| 2,041,159 | Wallace | May 19, 1936 |
| 2,510,418 | Roehrig | June 6, 1950 |

FOREIGN PATENTS

| | | |
|---|---|---|
| 139,892 | Austria | Dec. 27, 1934 |
| 247,074 | Great Britain | Feb. 11, 1926 |
| 469,393 | Great Britain | July 20, 1937 |

OTHER REFERENCES

"Springs and Suspension," by T. H. Sanders, The Locomotive Publishing Co., Ltd., 3 Amen Corner, London, E. C. 4, Fig. 358, pages 667 and 668.